United States Patent [19]
Ashbrook

[11] 3,808,939
[45] May 7, 1974

[54] POWDER MEASURING AND DISPENSING DEVICE

[76] Inventor: Clifford L. Ashbrook, 3740 Colony Dr., San Antonio, Tex. 78230

[22] Filed: Nov. 6, 1972

[21] Appl. No.: 304,063

[52] U.S. Cl. .......................................... 86/28, 86/33
[51] Int. Cl. .............................................. F42b 33/00
[58] Field of Search ...................... 86/23, 28, 31, 33

[56] References Cited
UNITED STATES PATENTS
3,361,024   1/1968   Sherrill ............................... 86/31 X

*Primary Examiner*—Stephen J. Lechert, Jr.

[57] ABSTRACT

A powder measure and dispensing device includes a hollow casing in which a slidable block moves to position a measure chamber therein first opposite an upward projecting inlet and then opposite a downward projecting outlet. A washer, preferably an O-ring washer, surrounds the inlet opening at the surface of the block where the opening enters the hollow casing to ensure precision of powder measures in the measure chamber during the charging operation.

8 Claims, 3 Drawing Figures

3,808,939

3,808,939

POWDER MEASURING AND DISPENSING DEVICE

BACKGROUND OF THE INVENTION

1. Field of the Invention

This invention relates to a measuring and dispensing device, and more specifically to such a device useful in precisely measuring powder and dispensing the measured powder into a cartridge or shell case.

2. Description of the Prior Art

It is very desirable that the quantity of the powder forming a charge for a shell casing or cartridge be exactly determined. The quantity of the powder determines to a large extent the characteristics of the trajectory of the projectile fired from the casing or cartridge. Even a slight variation in powder quantity from charge to charge will cause a sufficient variation from shot to shot so as to cause poor scores in target shooting or to cause missed shots in the actual hunting of game.

Various powder measures have been employed. One common type measure employs a rotating drum. A compartment in the drum is rotated via a handle to a reservoir in the powder measure and is filled. The drum is then rotated so the powder in the compartment may be dumped into a filter for filling the shell.

The difficulties with such a powder measure is that the reservoir first has to be filled with gun powder, often resulting in spills. This can be dangerous when using double-base powders since such powders include nitroglycerin as an ingredient that can be accidently ignited by such things as metal shoe nails rubbing on a concrete floor.

In addition to the possibility of spills, it has been discovered that the quantity of powder is not always uniform. One reason is that the particles or granules of powder are appreciably dimensioned and as the drum rotates the compartment from the reservoir inlet, a number of things can happen. First, the edges of the two surfaces at the compartment/inlet opening often cause particles to kick up as the drum rotates and be left out of the compartment. Second, granules are often sheared, the dust from the shearing action jamming the rotation of the drum. The dust from the shearing also becomes an abrasive material that acts on the moving parts. Third, when the drum sticks because of the presence of this powder, the operator tends to shake the measure in forcing the drum to rotate, thereby causing the powder to pack down and resulting in non-uniform density volumes to be measured.

Other measure and dispensing apparatus are available in addition to the drum type described, but none has overcome all of the above-enumerated disadvantages.

SUMMARY OF THE INVENTION

One feature of this invention, therefore, is to provide an improved hand-held powder measure and dispensing apparatus that eliminates operation sticking present in prior art devices.

Another feature of this invention is to provide an improved, inexpensive powder measure and dispenser that accurately and uniformly measures quantities of powder from measure to measure.

Yet another feature of this invention is to provide an improved powder measure and dispensing apparatus attachable directly to the source powder can, thereby eliminating excessive handling of powder by the operator and eliminating the necessity of filling a reservoir in the apparatus.

A preferred embodiment of the present invention includes an elongated hollow casing having oppositely disposed, but laterally displaced, inlet and outlet conduits. A slidable block is positionable within the casing so that a measure chamber therein can receive powder from the inlet conduit in one position and dispense into the outlet conduit in a second position. A spring-biased, pistol-grip actuator may be used to position the block. A deformable O-ring washer is secured in the casings surrounding the inlet conduit at the location of the slidable block.

In operation, the powder from the source that fills the chamber and extends up the inlet conduit is skimmed off upon actuation of the block. The washer prevents shearing of the powder granules. The curved surface of the washer settles the granules of powder in the chamber that would otherwise kick up back into the conduit without excessive compacting action. Further, since shearing is eliminated, there is no sticking and the creation of abrasive powder is minimized.

Another feature of the invention includes a funnel-shaped cap that can be placed directly on the can of powder which has a depending portion when the can is inverted that fits directly into the inlet conduit. Use of the cap eliminates extra handling of the powder from can to shell.

The outlet conduit may be conveniently shaped with an internal curvilinear surface to accommodate varying sizes of cartridge openings.

The size of the chamber in the slidable block may be adjusted for different volumes via an advancing screw in a volume-control block that closes off or opens up the chamber. In fact, the screw may be calibrated so that one turn of the screw has a definite relationship in terms of grains in the measure volume.

BRIEF DESCRIPTION OF THE DRAWINGS

So that the manner in which the above-recited features, advantages and objects of the invention, as well as others will become apparent, are attained and can be understood in detail, more particular description of the invention briefly summarized above may be had by reference to the embodiments thereof which are illustrated in the appended drawings, which drawings form a part of this specification. It is to be noted however that the appended drawings illustrate only typical embodiments of the invention and are therefore not to be considered limiting of its scope, for the invention may admit to other equally effective embodiments.

In the Drawings.

Figure 1:
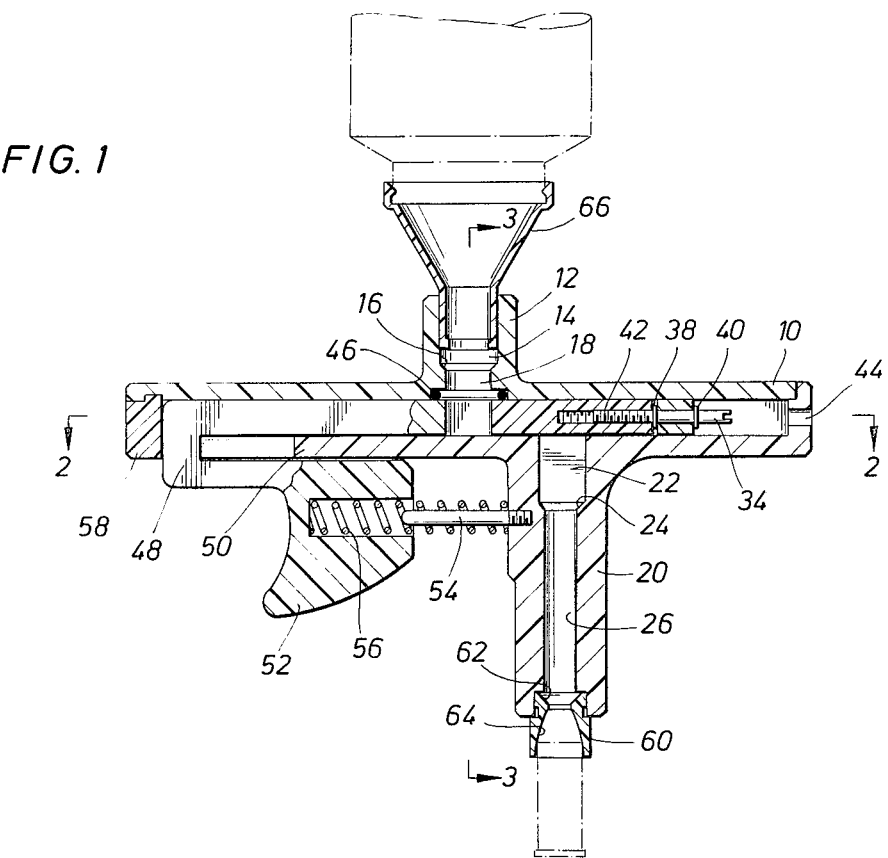
FIG. 1 is a vertical cross-section of a preferred embodiment of the invention apparatus.
Figure 2:
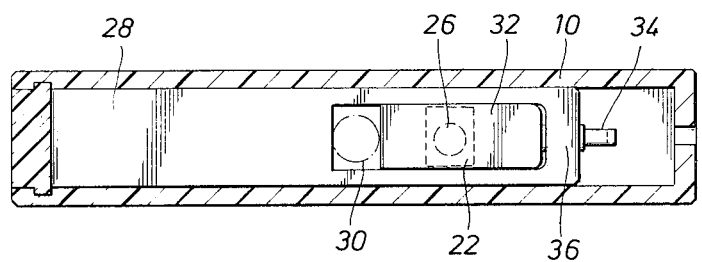
FIG. 2 is a horizontal cross-section of the embodiment illustrated in FIG. 1, taken at 2—2.
Figure 3:
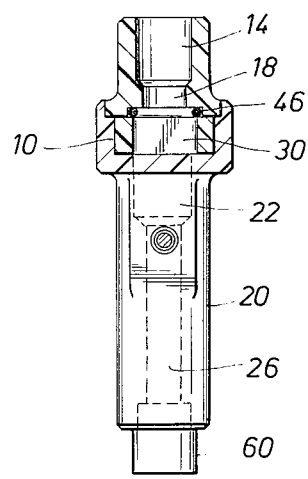
FIG. 3 is a vertical cross-section of the embodiment illustrated in FIG. 1, taken at 3—3.

Now referring to the drawings, a preferred embodiment of the invention is shown in vertical cross-section in FIG. 1. The powder measuring and dispensing device which is there illustrated includes an elongated hollow casing 10 constructed in a manner hereinafter described. Inlet conduit 12 communicates with casing 10 from the top and, at a longitudinally displaced position therefrom, outlet conduit 20 communicates with casing 10 from the bottom.

Inlet conduit 12 includes a bore opening into the hollow of casing 10. The upper part of this bore is annular bore 14 and is preferably circular in configuration. It reduces at shoulder 16 to annular bore 18. In similar fashion, generally rectangular annular bore 22 in outlet conduit 20 reduces at shoulder 24 to preferably circular, annular bore 26.

A slidable block 28 is accommodated by the hollow of casing 10, the dimensional tolerances between block 28 and the hollow of casing 10 being sufficiently close that powder cannot escape from the measure path to be hereinafter described. The slidable block is sufficiently longitudinally shorter than the hollow of casing 10 to permit measure chamber 30 therein to be alternately positioned opposite inlet conduit bore 18 and outlet conduit bore 22. Measure chamber 30 is a precisely determined part of a vertical opening passing completely through slidable block 28 and in which positional block 32 is located. Block 32 is set at a predetermined position within this opening to determine the dimension of measure chamber 30 located at the end of the opening and which is located opposite the inlet conduit when slidable block 28 is in the illustrated at rest position.

The location of positional block 32 is determined by the setting of rotatable screw 34 which joins integral end piece 36 of block 28 with positional block 32. As best may be seen in FIG. 1, rotatable screw 34 is secured to integral end piece 36 via retaining rings 38 and 40 located on either side thereof. The thread portion 42 of screw 34 operates within positional block 32, rotation of screw 34 horizontally positioning block 32 within the opening of block 28.

Inlet conduit bore 18 widens in dimension just before it opens into the hollow of casing 10 to accommodate deformable washer 46, which is preferably an O-ring. The depth of this O-ring groove is, in one embodiment, .066 inch and the accommodated deformable O-ring has an outside diameter of .070 inch, resulting in a slight compression of the O-ring that keeps the ring firmly in place and determining that there is to be a sliding fit between the O-ring washer and the top surface of slidable block 28.

As may be further seen in FIG. 1, on the side opposite inlet conduit 12 from outlet conduit 20, slidable block 28 continues to form a U-shaped piece 48 around a cut-out portion 50 of casing 10. The end of slidable block 28 continues past the U-shaped piece to form a convenient trigger-shaped handle or actuator 52. When the device is used, as will be hereafter explained, the palm of the hand of the operator cradles outlet conduit 20 and one or more fingers surround handle 52, the overall effect being similar to a pistol grip.

A post 54 is threadably connected at right angles to outlet conduit 20 and projects toward handle 52. Opposite post 54, an opening is included in handle 52. Surrounding post 54 and operating within the opening in handle 52 is a compression spring 56 that biases handle 52 away from outlet conduit 20.

A stop plug 56 abuts slidable block 28 to prevent its removal from casing 10. Stop plug 58 is attached to casing 10 via a mating tongue-and-groove connection arrangement. It will be noticed that plug 58 is removable so that slidable block 28 may be removed from casing 10 to facilitate cleaning.

Finally, a bottom plug piece 60 is press fitted into the bottom of outlet conduit 20, the plug having a bore therethrough which is concentric with bore 26. Note that at the bottom of conduit 20, bore 26 widens to accommodate plug 60. Upper end 62 of the bore in plug 60 is funnel shaped and bottom end 64 of the bore is arcuate shaped, for a purpose to be hereinafter discussed. Around the outside of the upper portion of plug piece 60 is a groove, which has the effect of vacuum sealing plug piece 60 in place.

In manufacturing the powder measuring and dispensing device described above, the majority of the non-metal and non-rubber pieces are made from an acrylic. The only rubber piece normally used is washer 46. The metal pieces include screw 34, retaining rings 38 and 40, post 54 and spring 56. Casing 10 may be conveniently fabricated apart from conduits 12 and 20 and apart from the top piece into which conduit 12 fits.

Slidable block 28 may be conveniently made of delrin a derivative of nylon. Once the acrylic casing is made, outlet conduit is glued to casing 10 with a convenient molymer or other suitable substance and inlet conduit is glued to the not-yet-joined top piece of the casing. The slidable block is then made to be a press fit into the hollow casing 10. A solvent is then applied to the areas of contact between the slidable block and the inside surface of the acrylic casing. A suitable solvent is one that dissolves either the acrylic material or the delrin material without dissolving the other. Since the chemical composition are entirely different, such solvents are readily available.

When the slidable block can slide within the hollow without a great deal of pressure, the solvent is then wiped or washed off before the fit becomes too loose. Hence, the close tolerance that is required is achieved. The top piece of casing 10 may then be permanently affixed to the rest of the casing body, again by gluing with a suitable molymer.

Before explaining the use of the device which is described above, an understanding of the nature of typical gun powder is necessary. First, there are 7,000 grains per pound. It is desirable to measure the quantity of gun powder to obtain the consistency required by gun enthusiast within one-tenth of a grain. Rifle shell charges are typically in range between 24 and 75 grains of powder.

There are two common types of powder. The first is designated IMR, which is a single base powder comprising a nitrocellulose. The covering material for each of the particles of powder and the size of the particle determines its burning rate. The other kind of gun powder which is common is referred to as a "double-base" powder. The particles of double-base powder are a combination of nitrocellulose and nitroglycerin. Double-base powder has approximately one-half the bulk density of IMR powder.

Powder is dispensed from cans. It has heretofore been normal procedure to store the cans with the top that they come with until time for use. The powder is then shaken from the can through a funnel into a charging chamber, in one of the prior art powder measuring and dispensing devices or onto a scale or other device, from which the measured powder is then dispensed into the shells to be loaded.

One of the structures present in the present invention is a funnel shaped lid 66 for snapping onto the can once the top is removed and which may be plugged at its opening. This permits storing of the gun powder can with a top which is suitable for directly connecting with the powder measuring and dispensing device which has previously been described. A suitable top is shown in FIG. 1 attached to a can, partly shown in phantom section. The depending portion 68 of top 66 fits snugly into top annular bore 14 of inlet conduit 12.

When the can and top are in place as shown in FIG. 1, the assembly may be positioned as thereshown, permitting the powder to drop out of the can and through bore 14 to fill measure chamber 30. The assembly is then placed so that arcuate shaped bore 64 is pressed over the shell cartridge to be loaded. The arcuate sides of the bore permit accommodation of the bore to varying diameter sizes of shell. The shell may be conveniently held in a loading block so that it does not tip during loading, although it may be merely hand-held.

To discharge the measured amount of powder from measure chamber 30, a firm squeeze on trigger handle 52 is required, which positions measure chamber 30 over bore 22 of outlet conduit 20. When this occurs the powder drops down through the bore and into the shell to complete the charging operation.

Washer 46 performs a number of functions in the operation just described. Gun powder, particularly IMR powder, is of sizable dimension and were washer 46 not present, the sliding of block 10 would cause particles to kick up out of measure chamber 30 and back into bore 18 thereabove. This would give an inaccurate measurement to the powder in the chamber that would be discharged.

Further, without washer 46, many of the particles that kick up would be severed by the edge of chamber passing from bore 18 when block 28 is slid. Such severing not only changes the quality of the burning rate of those particles which are severed, but it also creates dust which causes the slidable block to bind and become stiff to pull. When this binding action occurs, the operator is tempted to jiggle the unit and create packing of the gun powder within the chamber. This, of course, packs more particles within the chamber than mere gravity feeding would do and therefore cause a bigger quantity to be measured than intended.

A device as above described using an O-ring consistently measures 24–75 grain measures within ±0.1 grain. A device as above described, but using a flat washer instead of an O-ring, consistently measures 24–75 gain measures within ±0.2 grain. A device as above described, but with a continuous bore 18 and no washer or O-ring 46, only consistently measures 24–75 grain measures within ±0.4 grain, not nearly sufficiently satisfactory for the purist.

In one embodiment of the invention, a satisfactory correlation was developed between the size of measure chamber 30 and the amount of rotation of screw 34. In this particular case, a 32-pitch screw was used. One complete revolution of the screw changed the measure amount by 1 grain.

Although illustrated with a screw head for receiving a screw driver through screw adjusting opening 44, screw 34 may have a knurled head for turning with thumb and finger, the head projecting through opening 44 when handle 52 is squeezed. This would permit adjusting the size of chamber 30 without the need of a special tool.

It has also been discovered that, since the apparatus operates so easily, for large shells it is convenient to set the measure chamber size for one-half the charge size. For example, assume the charge size to be 60 grains.

The chamber may then be set to measure 30 grains. Two squeezes of handle 52 would dump the correct amount of powder into the shell.

For attractiveness, the entire device may be made opaque, either by mixing a color pigment with the acrylic or by painting. However, if this is done, it is desirable to leave at least the bottom portion of outlet conduit 20 transparent so that the operator can see the powder dump into the shell. Otherwise, the can could empty without realization on the part of the operator.

It may be noted that top 66 and bottom plug piece 60 may be used together as a convenient funnel combination for special purposes. That is, plug 60 may be conveniently dimensioned to press into the bottom of the funnel-shaped top 66 in much the same manner as it plugs into the bottom of conduit 20. One such use may be in combination with the filling of shell cartridges from a scale measure. In this measurement method, the proper amount of powder is measured onto a balance scale, usually on a piece of paper. The paper may then be picked up and curled slightly to allow dumping of the powder from the paper, through the funnel and into the shell cartridge.

Bore 64 has been described as curvilinear and as arcuate. Actually, straight, angled sides would be acceptable, but the curved sides have proved more satisfactory.

While a particular embodiment of the invention has been shown and discussed, it will be understood that the invention is not limited thereto, since many modifications in addition to the ones mentioned may be made and will become apparent to those skilled in the art.

What is claimed is:

1. A powder measure and dispensing apparatus, including
    an inlet conduit,
    measuring means having a measure chamber defined therein for receiving unmeasured quantities of powder from said inlet conduit in a first position thereof and for discharging the measured powder therein in a second position thereof, and
    a deformable washer disposed in fixed relation to said inlet conduit, said washer surrounding at least a portion of the opening of said inlet conduit and contacting the contiguous edges of said measure chamber when said chamber is moved from said first position.

2. A powder measuring and dispensing device for loading a cartridge case, comprising
    an elongated hollow casing,
    an inlet conduit communicating from the top with the hollow of said casing,
    an outlet conduit longitudinally displaced from siad inlet conduit communicating from the bottom with the hollow of said casing,
    a slidable block accommodated by said hollow having a measure chamber therein for being alternately positioned between said inlet conduit and said outlet conduit,
    a deformable washer secured within said casing, said washer surrounding the opening of said inlet conduit and touching said slidable block, and
    means for sliding said block for alternately positioning said measure chamber opposite said inlet conduit to receive powder by gravity action and opposite said outlet conduit to dispense the powder from said chamber into the cartridge case, said washer preventing powder particles from shearing, interfering with said sliding action and from being kicked up and out of said measure chamber.

3. A powder measuring and dispensing device as set forth in claim 2, wherein said inlet conduit projects upwardly from said casing to matingly receive the dispensing spout from a container of powder.

4. A powder measuring and dispensing device as set forth in claim 2, wherein said outlet conduit is circular in internal horizontal cross-section and projects downwardly from said casing, the longitudinal internal sides being arcuate to matingly accommodate cartridge casing openings of varying sizes.

5. A powder measuring and dispensing device as set forth in claim 2, wherein the measure chamber includes an adjustably positional block so that the opening therein for receiving and dispensing powder can be set to measure powder of varying volume.

6. A powder measuring and dispensing device as set forth in claim 5, wherein said positional block is connected to said slidable block via a rotationable screw retained in said positional block and threadably advanceable in an aperture in said slidable block.

7. A powder measuring and dispensing device as set forth in claim 2, wherein said washer is an O-ring.

8. A powder measuring and dispensing device as set forth in claim 7, wherein said O-ring is circular in transverse cross section, thereby providing a rounded shoulder to the powder as said slidable block carries the measure chamber from said inlet conduit.

* * * * *